(12) United States Patent
Yeager et al.

(10) Patent No.: US 6,347,036 B1
(45) Date of Patent: Feb. 12, 2002

(54) APPARATUS AND METHOD FOR MOUNTING A HEAT GENERATING COMPONENT IN A COMPUTER SYSTEM

(75) Inventors: Susan A. Yeager; Rakesh Bhatia, both of Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 09/538,371

(22) Filed: Mar. 29, 2000

(51) Int. Cl.[7] .................................................. G06F 1/20
(52) U.S. Cl. ........................ 361/687; 361/695; 165/122; 257/719
(58) Field of Search ................................. 361/687, 699, 361/700, 695, 697; 165/80.3, 80.4, 104.33, 185, 122–126; 62/259.2; 174/15.2, 16.3; 257/693, 718, 719

(56) References Cited

U.S. PATENT DOCUMENTS

| | | | |
|---|---|---|---|
| 4,587,595 A | 5/1986 | Staples | 361/704 |
| 4,698,663 A | 10/1987 | Sugimoto et al. | 257/718 |
| 4,745,456 A | 5/1988 | Clemens | 257/718 |
| 4,803,546 A | 2/1989 | Sugimoto et al. | 257/718 |
| 5,276,585 A | 1/1994 | Smithers | 361/704 |
| 5,321,582 A | 6/1994 | Casperson | 361/713 |
| 5,327,324 A | 7/1994 | Roth | 361/707 |
| 5,331,507 A | 7/1994 | Kyung et al. | 361/720 |
| 5,396,404 A | 3/1995 | Murphy et al. | 361/719 |
| 5,409,392 A | 4/1995 | Marks et al. | 439/266 |
| 5,521,439 A | 5/1996 | Casati et al. | 257/718 |
| 5,561,325 A | 10/1996 | Ueno et al. | 257/718 |
| 5,581,442 A | 12/1996 | Morosas | 361/704 |
| 5,640,305 A | 6/1997 | Smithers | 361/719 |
| 5,734,556 A | 3/1998 | Saneinejad et al. | 361/719 |
| 5,764,483 A | * 6/1998 | Ohashi et al. | 361/699 |
| 5,781,409 A | * 7/1998 | Mecredy, III | 361/687 |
| 5,833,036 A | 11/1998 | Gillespie | 188/285 |
| 5,860,195 A | 1/1999 | Wang | 361/704 |
| 5,870,287 A | 2/1999 | Rodriguez et al. | 361/704 |
| 5,883,782 A | 3/1999 | Thurston et al. | 361/719 |
| 5,923,179 A | 7/1999 | Taylor | 324/755 |
| 5,977,623 A | 11/1999 | Ahn | 257/693 |
| 6,097,596 A | * 8/2000 | Cipolla et al. | 361/687 |
| 6,134,106 A | * 10/2000 | Tao et al. | 361/687 |
| 6,137,683 A | * 10/2000 | Lee et al. | 361/704 |
| 6,157,540 A | * 12/2000 | Eddings et al. | 361/727 |

* cited by examiner

*Primary Examiner*—Leo P. Picard
*Assistant Examiner*—Hung Van Duong
(74) *Attorney, Agent, or Firm*—Haynes and Boone, LLP

(57) ABSTRACT

An apparatus for mounting a heat generating computer component includes a base member having a frame mounted thereon. The frame includes a passage extending therethrough. A socket is mounted on the base member in the passage of the frame. The heat generating component is mounted on the socket. A heat extraction body is mounted on the heat generating component. A retaining member is movably attached to the base member. The retaining member is movable between an open position and a closed position with respect to the passage. A resilient member is resiliently engaged against the heat extraction body when the retaining member is in the closed position, urging the heat extraction body into contact with the heat generating component. Mechanical tolerances of the heat extraction body and the heat generating component are compensated for by captive, self-adjusting mounting hardware such that tolerance variability does not adversely affect heat transfer performance.

23 Claims, 3 Drawing Sheets

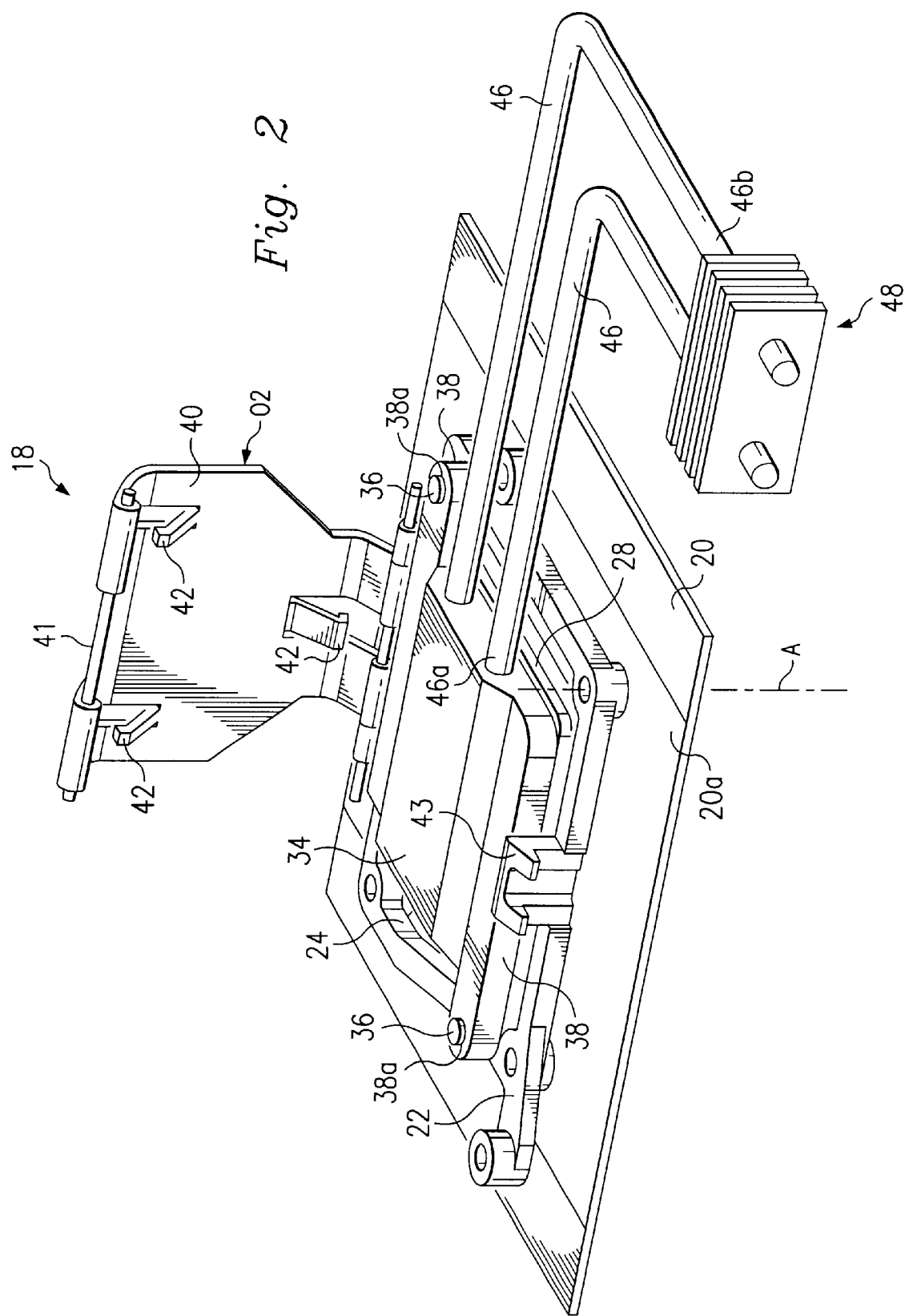

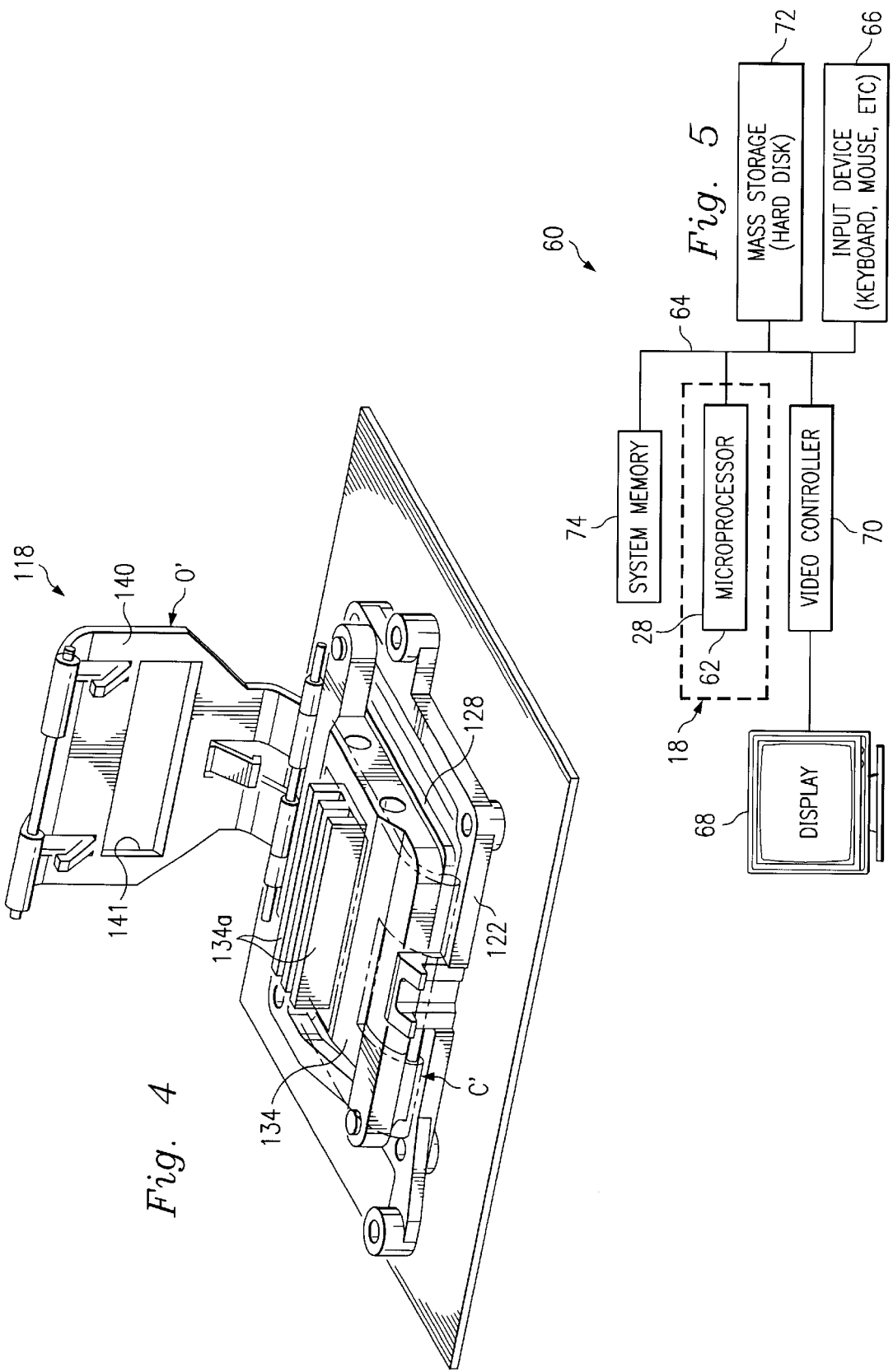

APPARATUS AND METHOD FOR MOUNTING A HEAT GENERATING COMPONENT IN A COMPUTER SYSTEM

BACKGROUND

The disclosures herein relate generally to computer systems and more particularly to an apparatus and method for mounting a heat generating component in a computer system.

Heat dissipating devices are commonly used to aid in dissipating heat from heat generating components in electronic devices such as computers. Heat dissipating devices are configured to readily dissipate heat from one or more heat generating components to the surrounding atmosphere or to an attached cooling component. To provide for acceptable and efficient heat transfer, a heat extraction body of the heat dissipating device must be in sufficient contact with the heat generating component.

Current methods of attaching a heat extraction body to a surface of a heat generating component includes the use of coil springs. The springs are compressed to develop a force for engaging the heat extraction body against the heat generating component. The shortcomings of this technique include numerous loose parts to assemble. Typically, as many as four coil springs and four screws are used to fasten the heat extraction body to the heat generating component. This technique also requires that an assembly torque specification for the fasteners be followed to ensure that the proper force is applied to the heat extraction body. There is also a possibility of the need for special assembly instructions specifying a specific tightening order for the fasteners to prevent binding.

Improved system components for electronic devices such as computers are rapidly and continuously being introduced in the market. In the case of a central processing unit (microprocessor) of a computer, the operating speeds are continually increasing. Because the microprocessor largely dictates the performance of a given computer, it is desirable to immediately incorporate the latest microprocessor offering into the manufacture of computer systems at the most economical manufactured cost. This practice effectively controls the inventory of computers with non-current microprocessor technology.

Several manufacturing strategies may be employed to accommodate frequent revisions to the microprocessor in the manufacture of a particular computer or line of computers. To speed delivery and minimize inventory of motherboards having non-current microprocessor technology, microprocessors may be purchased directly from the supplier and installed on the motherboard at the computer manufacturing facility. This often necessitates buying the microprocessor in a bare chip format (no integral heat spreader plate) rather than as a packaged microprocessor module. To enable the microprocessor to be attached to the motherboard at the computer manufacturing facility, the motherboard includes a socket for receiving the microprocessor rather than the microprocessor being soldered directly to the motherboard.

U.S. Pat. No. 5,977,623 discloses a semiconductor package including a socket that is adaptable to a multiple pin structure. The package includes a nonconductive base layer, a plurality of conductive metallic leads that extend vertically through the base layer and a wiring layer in which a pattern of fine metallic wires are formed to electrically couple the conductive metallic leads to a semiconductor chip mounted in the socket. A recess is formed in the central portion of the wiring layer and a cover for closing the upper portion of the recess is attached to the socket. A semiconductor device is mountable on the bottom portion of the recess and conductive wires electrically couple the semiconductor chip to the fine metallic wires of the wiring layer. The socket includes a socket body having a hinged cover. A first plurality of socket pins are arranged to couple with leads on a bottom surface of a semiconductor chip package mounted in the socket. A second plurality of socket pins are arranged to couple with leads on peripheral side surfaces of a semiconductor chip package mounted in the socket. The cover may include an integral heat sink portion.

U.S. Pat. No. 5,923,179 discloses a test socket used to test an integrated circuit that is mounted on a package or circuit board. The test socket includes a base that supports the integrated circuit and the circuit board. Pivotally connected to the base of the socket are a pair of heat sinks that can be moved between a first position and a second position. When in the first position, the heat sinks are pressed into contact with a semiconductor of either the package or integrated circuit to provide a direct conductive path between the integrated circuit die and the heat sinks. A plurality of test contacts are placed into contact with a plurality of surface pads located on the package to test the package or integrated circuit. The direct conductive path between the heat sinks and the semiconductor device lowers the overall thermal impedance of the socket assembly and the junction temperatures of the integrated circuit during an electrical test routine.

U.S. Pat. No. 5,409,392 discloses a socket for carrying an integrated circuit (IC) package. The socket, which is particularly useful for burn-in testing, includes a base which houses a plurality of conductive contacts and a movable top pivotally connected to the base. A table is connected to the base and supports the IC package after insertion. The socket also includes a contact actuation plate which is operably connected to the movable top and is pivotal with the top. Latches are movably connected to the base and shift with the top between latched and unlatched positions to secure the IC atop the table during testing. The actuator plate may also include retractable locator pins to insure proper IC alignment in the socket.

Microprocessor modules without an integral heat spreading plate can pose a unique challenge for mounting a heat dissipating device thereon. To provide optimum heat transfer, it is preferred for the heat extraction body to be brought into direct contact with the microprocessor chip with a nominal amount of contact pressure applied uniformly over the area of the microprocessor chip. A tolerance build-up associated with the socket, the microprocessor and the heat extraction body often complicate the attachment of the heat dissipating device to the heat generating component. Insufficient contact pressure between the heat extraction body and the heat generating component reduces thermal efficiency. Excessive pressure can distort the heat extraction body, reducing the level of heat transfer. Furthermore, excessive pressure can also damage to the microprocessor chip or motherboard due to stress concentrations. Therefore, what is needed is an apparatus for mounting a heat generating component and a heat dissipating device on a printed circuit substrate that economically and reliably compensates for tolerance build-up.

SUMMARY

Accordingly, in one embodiment, a heat generating component is mounted on a base member using a free-floating heat extraction body and resilient members mounted on a retaining member to compensate for dimensional tolerances. To this end, an apparatus for removing heat from a computer component includes a base member having a frame member mounted thereon. The frame defines an opening therein for receiving a heat generating computer component. A heat extraction body is adjacent the opening for being mounted on the heat generating component. A retaining member is mounted adjacent the frame for movement into engagement with the heat extraction body. A resilient interconnection is provided between the retaining member and the heat extraction body for urging the heat extraction body into engagement with the heat generating component.

A principal advantage of this embodiment is that mechanical tolerances of the heat extraction body and the heat generating component are compensated for by captive, self-adjusting mounting hardware such that tolerance variability does not adversely affect heat transfer performance.

BRIEF DESCRIPTION OF THE DRAWING FIGURES

FIG. 2 is a perspective view illustrating an embodiment of an apparatus for mounting a heat generating component and a heat dissipating device on a base member.

FIG. 4 is a perspective view illustrating another embodiment of an apparatus for mounting a heat generating component and a heat dissipating device on a base member.

FIG. 5 is a block diagram view illustrating an embodiment of a computer system including a microprocessor having a heat dissipating device attached thereto.

DETAILED DESCRIPTION

Figure 1:
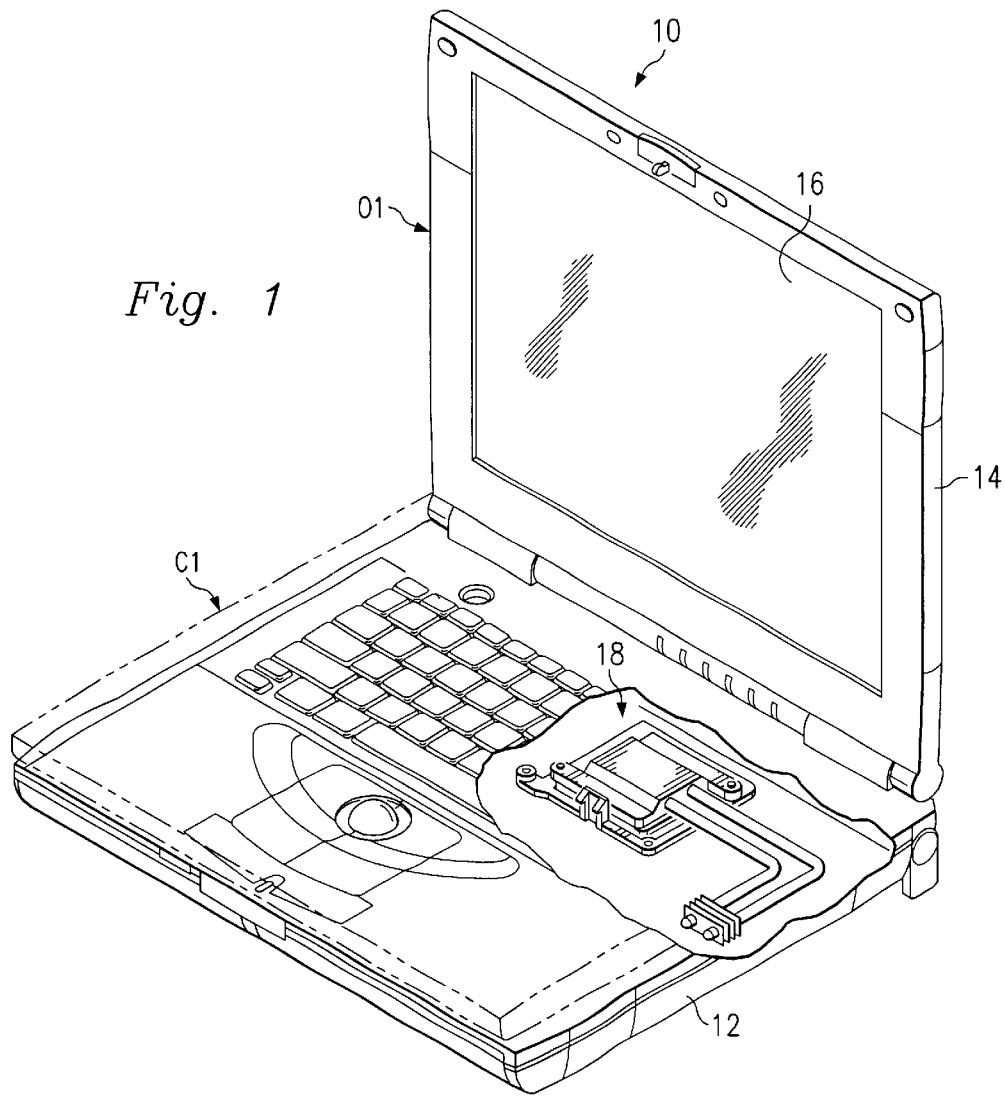
FIG. 1 is a perspective view illustrating an embodiment of a portable computer.

An embodiment of a portable computer 10 is illustrated in FIG. 1. The portable computer 10 includes a base enclosure 12 and a top enclosure 14 pivotally attached to the base enclosure 12. The top enclosure 14 is movable between an open position O1 and a closed position C1. An LCD panel 16 is mounted in the top enclosure 14. An apparatus 18 for mounting and cooling a system component such as a microprocessor, video controller, or the like is mounted in the base enclosure 12.

Figure 3:
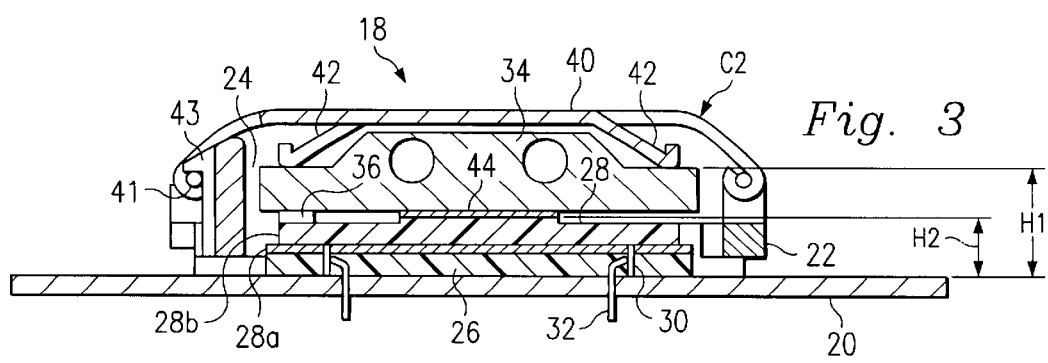
FIG. 3 is a cross sectional view of the mounting apparatus of FIG. 2 with a retaining member in a closed position.

Referring now to FIGS. 2 and 3, the apparatus 18 includes a base member 20 such as a motherboard or other type of printed circuit substrate. The base member 20 includes a reference voltage plane 20a. A mounting frame 22 including a passage 24 extending therethrough is mounted on the base member 20. In a preferred configuration, the mounting frame 22 is made of an electrically conductive material and is electrically connected to the reference voltage plane 20a. The mounting frame 22 may be attached to the base member 20 by mechanical fasteners such as screws or rivets, or it may be attached to the base member 20 through the use of an adhesive such as a conductive adhesive.

A socket 26, FIG. 3, is mounted on the base member 20 within the passage 24 of the mounting frame 22. A heat generating component 28, such as a system component of the portable computer 10, is mounted on and electrically connected to the socket 26. The heat generating component includes a plurality of first interconnect members 30, such as interconnect pins, that are engaged by corresponding second interconnect members 32 of the socket 26. In the embodiment illustrated in FIG. 3, the heat generating component 28 includes an interposer circuit 28a and a semiconductor device 28b such as an unpackaged semiconductor chip mounted on the interposer circuit 28a.

A heat extraction body 34, FIGS. 2 and 3, is engaged with a surface of the heat generating component 28. The mounting frame 22 includes a plurality of alignment members 36, such as pins, attached thereto. The heat extraction body 34 includes a plurality of reference members 38 having alignment holes 38a extending therethrough. Each alignment member 36 engages the alignment hole 38a of the corresponding reference member 38 to positively position the heat extraction body 34 with respect to the passage 24. By positively positioning the heat extraction body 34 with respect to the passage 24, the heat extraction body 34 is positively positioned with respect to the heat generating component 28. Furthermore, the configuration of the alignment members 36 and reference members 38 limits movement of the heat extraction body 34 in directions perpendicular to a reference axis A, FIG. 2, extending generally perpendicular to a surface of the base member 20. The heat extraction body 34 may move in a direction generally parallel to the reference axis A, permitting for height compensation for mechanical tolerances associated with the socket 26 and the heat generating component 28.

A retaining member 40, such as a hinged cover, is movably attached to the mounting frame 22 for being moved between an open position O2, FIG. 2, and a closed position C2, FIG. 3. A retention member 41 is attached to the retaining member 40 and a mating retention member 43 is attached to the mounting frame 22. The retention member 41 engages the mating retention member 43 when the retaining member 40 is moved to the closed position C2 for releasably securing the retaining member 40 in the closed position C2.

A plurality of resilient members 42, such as spring fingers, are integrally attached to the retaining member 40. In other embodiments (not shown), the resilient members 42 may be compression springs, leaf-type springs, compliant pads or the like that are disposed between the heat extraction body 34 and the retaining member 40, but that are not integral with the retaining member 40. The resilient members 42 compressibly engage the heat extraction body 34 when the retaining member is moved to the closed position C2, urging the heat extraction body 34 into contact with the heat generating component 28. A heat transfer material 44, such as a thermal pad or a phase change material, is disposed between the heat extraction body 34 and the heat generating component 28 for enhancing heat transfer.

As illustrated in FIG. 2, a plurality of heat routing members 46, such as heat pipes, are attached at a first end 46a to the heat extraction body 34. Each one of the heat routing members 46 are attached at a second end 46b to a heat dissipating body 48. Heat pipes illustrate one example of the heat routing members 46. The first end 46a corresponds to an evaporator portion of the heat pipe and the second end 46b of the heat routing member 46 corresponds to a condenser portion of the heat pipe. Cooling fins and a heat exchanger illustrate examples of the heat dissipating body 48. The combined use of the heat extraction body 34, the heat routing member 46 and the heat dissipating body 48 illustrate an example of a heat dissipating device.

A key advantage of the embodiments disclosed herein is that the apparatus 18 compensates for tolerance build-up associated with the socket 26, the heat generating component 28, and the heat extraction body 34. The socket 26, the heat generating component 28, and the heat extraction body 34 each have dimensional tolerance values that contribute to defining an overall height H1, FIG. 3. The overall height H1 is the vertical distance from the base member 20 to the surface of the heat extraction body 34 that is engaged by the resilient members 42. For commercially available components, this height is typically between 5.4 and 6.0 mm. The dimensional tolerance values of the socket 26 and the heat generating component 28 also contribute to defining a thermal interface height H2, FIG. 3. The thermal interface height H2 is the vertical distance from the base member 20 to the surface of the heat generating component 28 that is engaged by the heat extraction body 34.

The construction of the apparatus 18 allows the heat extraction body 34 to float with respect to the mounting frame 22, minimizing a thermal gap defined between the heat extraction body 34 and the heat generating component 28. The configuration of the resilient members 42 and the retaining member 40 results in the deflection of the resilient members 42 being based on the overall height H1. Even through the overall height H1 and the thermal interface height H2 vary, the resiliency of the resilient members 42 and the floating nature of the heat extraction body 34 compensate for tolerance-induced height variations.

Another key advantage of the embodiments disclosed herein is that the compensation for tolerance-induced height variations is accomplished automatically. The act of moving the retaining member 40 to the closed position C2 and engaging the retention member 41 with the mating retention member 43 engages the resilient members 42 with heat extraction body 34. Accordingly, the resilient members 42 are deflected, providing an applied force for urging the heat extraction body 34 into contact with the heat generating component 28. The resilient members 42 are constructed to provide a required applied force on the heat extraction member, even though the overall height H1 and the thermal interface height H2 vary according to the tolerance build-up. An applied force of 40 to 100 psi is common for commercially available microprocessors.

It is yet a further advantage of the embodiments disclosed herein that the mounting frame 22, the socket 26, the heat generating component 28 and the heat extraction body 34 may be electrically coupled to the reference voltage plane 20a. This type of construction provides a low impedance return current path between the various components of the apparatus 18, reducing noise in the circuitry. This is beneficial in applications where the heat generating component 28 operates at relatively high speeds.

Another embodiment of an apparatus 118 for mounting a heat generating component 128 is illustrated in FIG. 4. The apparatus 118 include a heat extraction member 134 including a plurality of integral cooling fins 134a. A retaining member 140 includes an opening 141 extending therethrough. The retaining member 140 is pivotally attached to a mounting frame 122 and is movable between an open position O' and a closed position C'. The cooling fins 134a extend through the opening 141 when the retaining member 140 is in a closed position C'.

An embodiment of a computer system 60 is illustrated in FIG. 5. The computer system 60 includes at least one microprocessor 62. The microprocessor 62 is mounted in the computer system 60 adjacent the apparatus 18, discussed above, and represents one example of a heat generating component. The microprocessor 62 is connected to a bus 64 which serves as a connection between the microprocessor 62 and other components of the computer system 60. An input device 66 is coupled to the microprocessor 62 to provide input to the microprocessor 62. Examples of input devices include keyboards, touchscreens, and pointing devices such as a mouse, a trackball and a trackpad. The computer system 60 may also include a display 68, such as the LCD panel 16, FIG. 1, which is coupled to the microprocessor 62 typically by a video controller 70. Programs and data are stored on a mass storage device 72 which is coupled to the microprocessor 62. Mass storage devices include components such as hard disks, optical disks, magneto-optical drives, floppy drives, and the like. A system memory 74 provides the microprocessor 62 with fast storage to facilitate execution of computer programs by the microprocessor 62. It should be understood that other busses and intermediate circuits can be employed between the components described above and microprocessor 62 to facilitate interconnection between the components and the microprocessor 62.

As a result, one embodiment provides a heat extracting apparatus including a base member having a frame mounted thereon. The frame includes a passage extending therethrough. A heat generating component is mounted in the passage. A heat extraction body is mounted on the heat generating component. A retaining member is mounted adjacent the heat extraction body and movable toward the heat extraction body. A resilient member is provided between the heat extraction body and the retaining member for urging the heat extraction body into contact with the heat generating component in response to moving the retaining member toward the heat extraction body.

Another embodiment provides a computer system including a printed circuit substrate and a frame mounted thereon. The frame includes a passage extending therethrough. A socket is mounted on the printed circuit substrate within the passage. A microprocessor is mounted on the socket. A system memory is coupled to provide storage to facilitate execution of computer programs by the microprocessor. An input is coupled to provide input to the microprocessor and a display is coupled to the microprocessor by a video controller. A mass storage is coupled to the microprocessor. A heat extraction body is mounted on the microprocessor. A retaining member is mounted adjacent to the printed circuit substrate for being moved between an open position and a closed position with respect to the passage. A resilient member is resiliently engaged against the heat extraction body in response to the retaining member being moved to the closed position for urging the heat extraction body into contact with the microprocessor.

A further embodiment provides a method of mounting a computer component. The method includes mounting a frame, including a passage extending therethrough, on a printed circuit substrate. A heat generating component is mounted on the printed circuit substrate in the passage. A heat extraction body is mounted on the heat generating component. A retaining member is moved from an open position to a closed position with respect to the passage. A resilient member is compressed between the heat extraction body and the retaining member in response to moving the retaining member to the closed position for urging the heat extraction body into contact with the heat generating component.

Another embodiment provides an apparatus for removing heat from a computer. A frame member is mounted on a base member. The frame member defines an opening therein for receiving a heat generating computer component. A heat extracting body is mounted adjacent the opening for engaging the heat generating component. A retaining member is mounted adjacent the frame member for movement into engagement with the heat extraction body. A resilient interconnection is provided between the retaining member and the heat extracting body for urging the heat extracting body into engagement with the heat generating component. p As it can be seen, the embodiments presented herein provide several advantages. Mechanical tolerances of the heat extraction body and the heat generating component are compensated for such that tolerance variability does not adversely affect heat transfer performance. All necessary hardware is captive to the apparatus such that there are no loose components required. No discrete fasteners or other components are required for mounting the heat dissipating extraction body or the heat generating component to the socket. The mounting technique is intuitive, requiring little or no special assembly instructions. The required applied force is self-adjusting such that no adjustments or measurements are required during assembly or servicing. The heat extraction member is precisely aligned with respect to the socket and the heat generating component.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A heat extracting apparatus comprising:
a base member;
a frame mounted on the base member, the frame including a passage extending therethrough;
a heat generating component mounted in the passage;
a heat extraction body mounted on the heat generating component;
a retaining member snapped into a closed position with the frame, closing the passage; and
a resilient member extending from the retaining member in compressed engagement with the heat extraction body when the retaining member is in the closed position.

2. The apparatus of claim 1, further comprising:
a reference member attached to the heat extraction body; and
an alignment member attached to the frame, the alignment member engaging the reference member for positioning the heat extraction body with respect to the passage.

3. The apparatus of claim 1 wherein the retaining member includes a cover pivotally connected to the frame.

4. The apparatus of claim 1 wherein the resilient member is integral with the retaining member.

5. The apparatus of claim 1 further comprising:
a heat transfer material disposed between the heat generating component and the heat extraction body.

6. The apparatus of claim 1, further comprising:
a socket attached to the base member within the passage of the frame.

7. The apparatus of claim 1 further comprising:
a heat routing member attached to the heat extraction body; and
a heat dissipating body attached to the heat routing member.

8. The apparatus of claim 2 wherein the reference member includes an aperture extending therethrough and wherein the alignment member includes a pin, the pin being received within the aperture.

9. The apparatus of claim 2 wherein the passage defines a reference axis extending generally perpendicular to the base member, the reference member engaging the alignment member to limit movement of the heat extraction body in directions generally perpendicular to the reference axis.

10. The apparatus of claim 3 further comprising:
a retention member attached to the cover; and
a mating retention member attached to the frame, the retention member engaging the mating retention member when the cover is moved toward the heat extraction body for releasably securing the cover in a closed position.

11. The apparatus of claim 5 wherein the heat transfer material is a phase change material.

12. The apparatus of claim 6 wherein the heat generating component includes a plurality of contacts electrically connected to corresponding contacts of the socket.

13. The apparatus of claim 6 wherein the heat generating component includes a semiconductor device mounted on an interposer circuit, the interposer circuit including a plurality of pins electrically connected to corresponding pin contacts of the socket.

14. The apparatus of claim 7 wherein the heat routing member is a heat pipe having an evaporator portion attached to the heat extraction body and a condenser portion attached to the heat dissipating body.

15. The apparatus of claim 10 wherein the heat extraction body includes a plurality of cooling fins attached thereto, the cooling fins extending through the retaining member when the retaining member is in the closed position.

16. The apparatus of claim 10 wherein the base member includes a printed circuit substrate.

17. The apparatus of claim 13 wherein the semiconductor device is an unpackaged semiconductor chip and wherein a surface of the heat extraction body is engaged against a corresponding surface of the unpackaged semiconductor chip.

18. The apparatus of claim 12 wherein the contacts of the heat generating component are pins and the corresponding contacts of the socket are pin contacts.

19. The apparatus of claim 16 wherein the printed circuit substrate includes a reference voltage layer, the mounting frame being made of an electrically conductive material and being electrically connected to the reference voltage layer.

20. The apparatus of claim 19 wherein the heat extraction body, the resilient member and the retaining member are made of an electrically conductive material and are electrically connected to the frame such that the heat extraction body is electrically connected to the reference voltage plane when the retaining member is in the closed position.

21. A computer system, comprising:
a printed circuit substrate;
a frame mounted on the printed circuit substrate, the frame including a passage extending therethrough;
a socket mounted on the printed circuit substrate within the passage;
a microprocessor mounted on the socket;
a system memory coupled to provide storage to facilitate execution of computer programs by the microprocessor;
an input coupled to provide input to the microprocessor;
a video controller coupled to the microprocessor;
a mass storage coupled to the microprocessor;
a heat extraction body mounted on the microprocessor in the passage;

a retaining member snapped into a closed position with the frame, closing the passage; and a resilient member extending from the retaining member in compressed engagement with the heat extraction body when the retaining member is in the closed position.

22. A method of mounting a computer component, comprising:

mounting a frame, including a passage extending therethrough, on a printed circuit substrate;

mounting a heat generating component on the printed circuit substrate in the passage;

mounting a heat extraction body in the passage on the heat generating component;

snapping a retaining member into a closed position on the frame, closing the passage; and compressing a resilient member into engagement with the heat extraction body when the retaining member is in the closed position.

23. Apparatus for removing heat from a computer component comprising:

a base member;

a frame member mounted on the base member, the frame member defining an opening therein for receiving a heat generating computer component;

a heat extraction body mounted in the opening for engaging the heat generating computer component;

a retaining member snapped into a closed position with the frame, closing the opening; and a resilient contact extending from the retaining member in compressed engagement with the heat extraction body when the retaining member is in the closed position.

* * * * *